United States Patent
Chen et al.

(10) Patent No.: US 10,659,794 B2
(45) Date of Patent: May 19, 2020

(54) APPARATUS AND METHOD FOR PALETTE DECODING

(71) Applicant: MEDIATEK INC., Hsin-Chu (TW)

(72) Inventors: Chi-Min Chen, Hsin-Chu (TW); Min-Hao Chiu, Hsin-Chu (TW); Chia-Yun Cheng, Hsin-Chu (TW); Yung-Chang Chang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/293,647

(22) Filed: Mar. 6, 2019

(65) Prior Publication Data

US 2019/0281312 A1  Sep. 12, 2019

Related U.S. Application Data

(60) Provisional application No. 62/639,025, filed on Mar. 6, 2018.

(51) Int. Cl.
| | |
|---|---|
| *H04N 19/124* | (2014.01) |
| *H04N 19/186* | (2014.01) |
| *H04N 19/182* | (2014.01) |
| *H04N 19/91* | (2014.01) |
| *H04N 19/157* | (2014.01) |
| *H04N 19/44* | (2014.01) |
| *H04N 19/119* | (2014.01) |

(52) U.S. Cl.
CPC ......... *H04N 19/186* (2014.11); *H04N 19/119* (2014.11); *H04N 19/157* (2014.11); *H04N 19/182* (2014.11); *H04N 19/44* (2014.11); *H04N 19/91* (2014.11)

(58) Field of Classification Search
CPC .... H04N 19/583; H04N 19/124; H04N 19/44; H04N 19/93
See application file for complete search history.

(56) References Cited

U.S. PATENT DOCUMENTS

2015/0189319 A1\* 7/2015 Pu ................. H04N 19/176
  375/240.03

\* cited by examiner

*Primary Examiner* — Anand S Rao
(74) *Attorney, Agent, or Firm* — Winston Hsu

(57) ABSTRACT

A palette decoding apparatus includes a palette color storage device which stores palette colors, a color index storage device which stores color indices of pixels, and a palette value processing circuit which generates a palette value for each pixel by reading data from the color index storage device and the palette color storage device. A frame is divided into first coding units, and each first coding unit is sub-divided into one or more second coding units. Before a palette value of a last pixel in a first coding unit is generated by the palette value processing circuit, a palette value of a non-last pixel in the first coding unit is generated by the palette value processing circuit and used by a reconstruction circuit of the video decoder.

20 Claims, 11 Drawing Sheets

APPARATUS AND METHOD FOR PALETTE DECODING

CROSS REFERENCE TO RELATED APPLICATIONS

This application claims the benefit of U.S. provisional application No. 62/639,025, filed on Mar. 6, 2018 and incorporated herein by reference.

BACKGROUND

The present invention relates to video decoding, and more particularly, to an apparatus and method for palette decoding.

The conventional video coding standards generally adopt a block based coding technique to exploit spatial and temporal redundancy. For example, the basic approach is to divide a source frame into a plurality of blocks (or coding units), perform intra prediction/inter prediction on each block, transform residues of each block, and perform quantization and entropy encoding. Besides, a reconstructed frame is generated to provide reference pixel data used for coding following blocks. For certain video coding standards, in-loop filter(s) may be used for enhancing the image quality of the reconstructed frame. A video decoder is used to perform an inverse operation of a video encoding operation performed by a video encoder.

The screen content may be a computer generated content that includes text, graphics and animations. For example, the screen content may be used in applications such as desktop sharing, video conferencing, social networks and remote education. Coding of the screen content should be different from that of a photographic content due to the fact that coding techniques that are proposed for captured image content cannot provide best coding efficiency for screen content. When the screen content is encoded at a video encoder by using a different coding tool (e.g., palette coding) other than that is being used for captured image content, there is a need for a proper decoding scheme (e.g., palette decoding) in a video decoder for reconstructing the screen content.

SUMMARY

One of the objectives of the claimed invention is to provide an apparatus and method for palette decoding.

According to a first aspect of the present invention, an exemplary video decoder is disclosed. The exemplary video decoder includes a palette decoding apparatus that has a palette color storage device, a color index storage device, and a palette value processing circuit. The palette color storage device is arranged to store palette colors decoded from a bitstream. The color index storage device is arranged to store color indices of pixels, wherein the color indices are decoded from the bitstream. The palette value processing circuit is arranged to generate a palette value for each pixel of the pixels by reading a color index of said each pixel from the color index storage device, searching for a palette color stored in the palette color storage device that is indexed by the color index of said each pixel, and setting the palette value of said each pixel by the palette color. A frame is divided into a plurality of first coding units, and each of the first coding units is sub-divided into one or more second coding units. Before a palette value of a last pixel in a first coding unit is generated by the palette value processing circuit, a palette value of a non-last pixel in the first coding unit is generated by the palette value processing circuit and used by a reconstruction circuit of the video decoder.

According to a second aspect of the present invention, an exemplary video decoding method is disclosed. The exemplary video decoding method includes: storing palette colors decoded from a bitstream into a palette color storage device; storing color indices of pixels into a color index storage device, wherein the color indices are decoded from the bitstream; and generating a palette value for each pixel of the pixels by reading a color index of said each pixel from the color index storage device, searching for a palette color stored in the palette color storage device that is indexed by the color index of said each pixel, and setting the palette value of said each pixel by the palette color. A frame is divided into a plurality of first coding units, and each of the first coding units is sub-divided into one or more second coding units. Before a palette value of a last pixel in a first coding unit is generated, a palette value of a non-last pixel in the first coding unit is generated and used by reconstruction of the non-last pixel.

According to a third aspect of the present invention, an exemplary video decoder is disclosed. The exemplary video decoder includes a palette decoding apparatus that has a palette color storage device, a color index storage device, and a palette value processing circuit. The palette color storage device is arranged to store palette colors decoded from a bitstream. The color index storage device is arranged to store color indices of pixels, wherein the color indices are decoded from the bitstream. The palette value processing circuit is arranged to generate a palette value for each pixel of the pixels by reading a color index of said each pixel from the color index storage device, searching for a palette color stored in the palette color storage device that is indexed by the color index of said each pixel, and setting the palette value of said each pixel by the palette color. A frame is divided into a plurality of first coding units, and each of the first coding unit is sub-divided into one or more second coding units. The palette value processing circuit does not start generating a palette value of a first pixel in a first group of at least one first coding unit until all palette colors needed by palette decoding of the first group are stored in the palette color storage device and color indices of all pixels of the first group are stored in the color index storage device. A processing time of generating palette values of pixels in the first group according to data read from the palette color storage device and the color index storage device overlaps a processing time of writing palette colors needed by palette decoding of a second group of at least one first coding unit into the palette color storage device and writing color indices of pixels of the second group into the color index storage device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . .". Also, the term "couple" is intended to mean either an indirect or direct electrical connection. Accordingly, if one device is coupled to another device, that connection may be through a direct electrical connection, or through an indirect electrical connection via other devices and connections.

Figure 1:
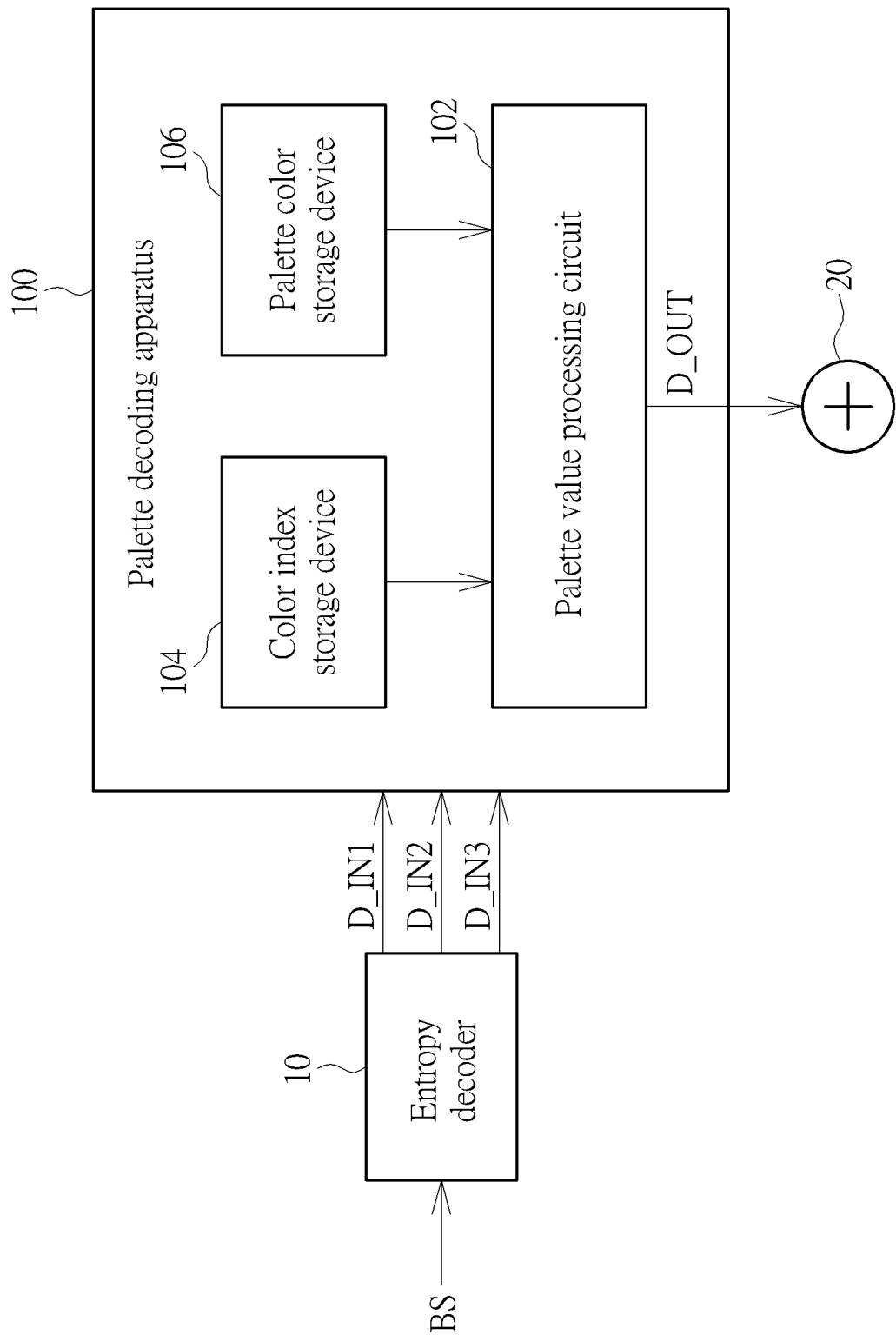
FIG. 1 is a diagram illustrating a palette decoding apparatus according to an embodiment of the present invention.

Palette coding utilizes the fact that there are few unique colors in screen content and tries to send palettes of these unique colors. The present invention proposes a high performance and low cost palette decoding scheme in a video decoder. FIG. 1 is a diagram illustrating a palette decoding apparatus according to an embodiment of the present invention. The palette decoding apparatus 100 may be implemented in a video decoder such as an AV1 decoder. The palette decoding apparatus 100 includes a palette value processing circuit 102, a color index storage device 104, and a palette color storage device 106. Any of the color index storage device 104 and the palette color storage device 106 may be implemented by an on-chip memory such as a static random access memory (SRAM), an off-chip memory such as a dynamic random access memory (DRAM), or a combination thereof.

An entropy decoder 10 in the video decoder receives a bitstream BS generated from a video encoder. The entropy decoder 10 decodes the bitstream BS to obtain signaled palette-related information, and provides the decoded palette-related information to the palette decoding apparatus 100. For example, the palette-related information derived from the bitstream BS may include palette size data D_IN1, palette color data D_IN2, and color index data D_IN3. In this embodiment, the palette color storage device 106 is arranged to store palette colors decoded from the bitstream BS, the color index storage device 104 is arranged to store color indices of pixels that are decoded from the bitstream BS, and the palette value processing circuit 102 is arranged to generate a palette value for each of the pixels by reading a color index of the pixel from the color index storage device 104, searching for a palette color stored in the palette color storage device 106 that is indexed by the color index of the pixel, and setting the palette value of the pixel by the palette color found in the palette color storage device 106. The palette value processing circuit 102 is further arranged to generate a palette value output D_OUT to a reconstruction circuit 20 of the video decoder, where the palette value output D_OUT includes palette values needed for reconstruction of pixels.

To achieve high performance and low cost palette decoding, the palette decoding apparatus 100 is designed to perform palette decoding in a small-sized coding unit based manner rather than a large-sized coding unit based manner. For example, one frame may be divided into a plurality of mode info (MI) units, and each of the MI units may be divided into one or more transform units (TUs). The palette decoding apparatus 100 may start outputting palette values of pixels in one small-sized coding unit (e.g., one TU) for reconstruction at the reconstruction circuit 20 before determining palette values of pixels in another small-sized coding unit (e.g., another TU). In other words, before a palette value of a last pixel in a large-sized coding unit (e.g., one MI unit) is generated by the palette value processing circuit 102, a palette value of a non-last pixel in the large-sized coding unit (e.g., one MI unit) is generated by the palette value processing circuit 102 and used by the reconstruction circuit 20 of the video decoder. In this way, the palette decoding apparatus 100 does not need a large-sized buffer to keep palette values of all pixels in one large-sized coding unit (e.g., one MI unit), thus relaxing the buffer requirement. Furthermore, the reconstruction circuit 20 can start reconstructing pixels in one large-sized coding unit (e.g., one MI unit) before palette values of all pixels in the large-sized coding unit (e.g., one MI unit) are obtained by the palette decoding apparatus 100, thus improving the overall decoding performance.

Figure 2:
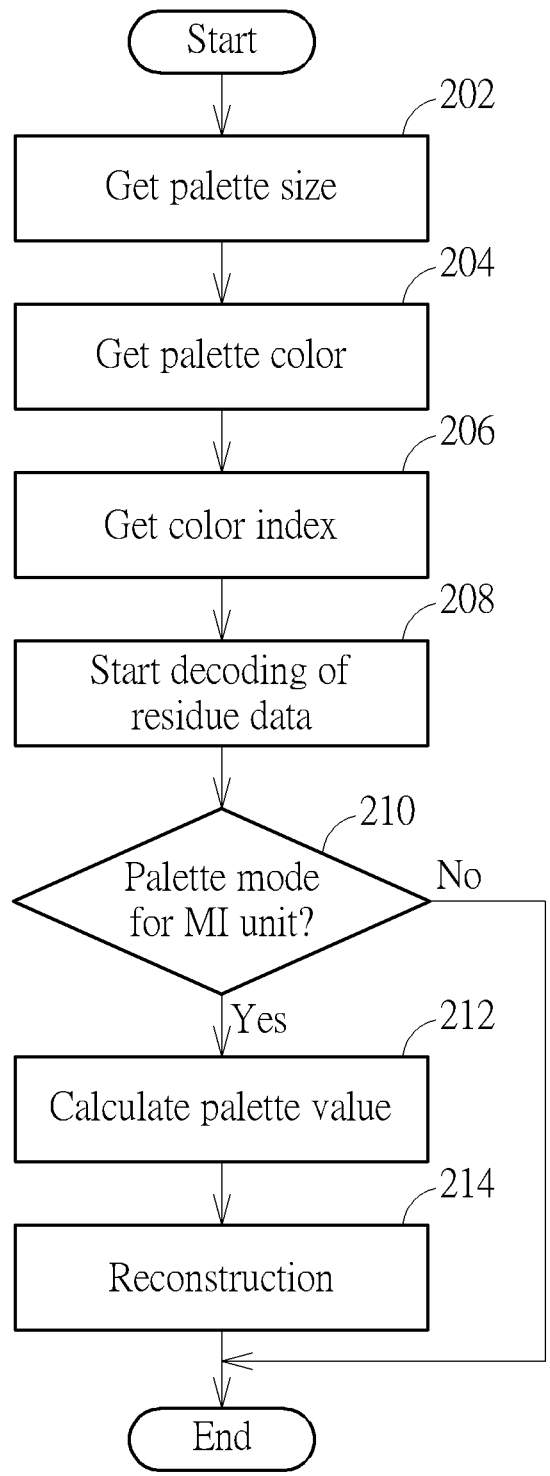
FIG. 2 is a flowchart illustrating a palette decoding process involved in reconstructing pixel values of pixels in one MI unit of a frame according to an embodiment of the present invention.

FIG. 2 is a flowchart illustrating a palette decoding process involved in reconstructing pixel values of pixels in one MI unit of a frame according to an embodiment of the present invention. Provided that the result is substantially the same, the steps are not required to be executed in the exact order shown in FIG. 2. At step 202, the palette decoding apparatus 100 gets the palette size data D_IN1 from the entropy decoder 10. At step 204, the palette decoding apparatus 100 gets the palette color data D_IN2 from the entropy decoder 10. At step 206, the palette decoding apparatus 100 gets the color index data D_IN3 from the entropy decoder 10. At step 208, decoding of residue data is started at the video decoder. At step 210, the palette decoding apparatus 100 checks if a palette mode is used by an MI unit by referring to a syntax element that is signaled via the bitstream BS. If the palette mode is not used by the MI unit, the palette decoding process of the MI unit is aborted. If the palette mode is used by the MI unit, the flow proceeds with step 212. The palette decoding apparatus 100 determines palette values of pixels in the MI unit according to information given by the palette size data D_IN1, the palette color data D_IN2, and the color index data D_IN3. At step 214, palette values of pixels in the MI unit are used by the reconstruction circuit 20 for reconstruction of pixels.

Figure 3:
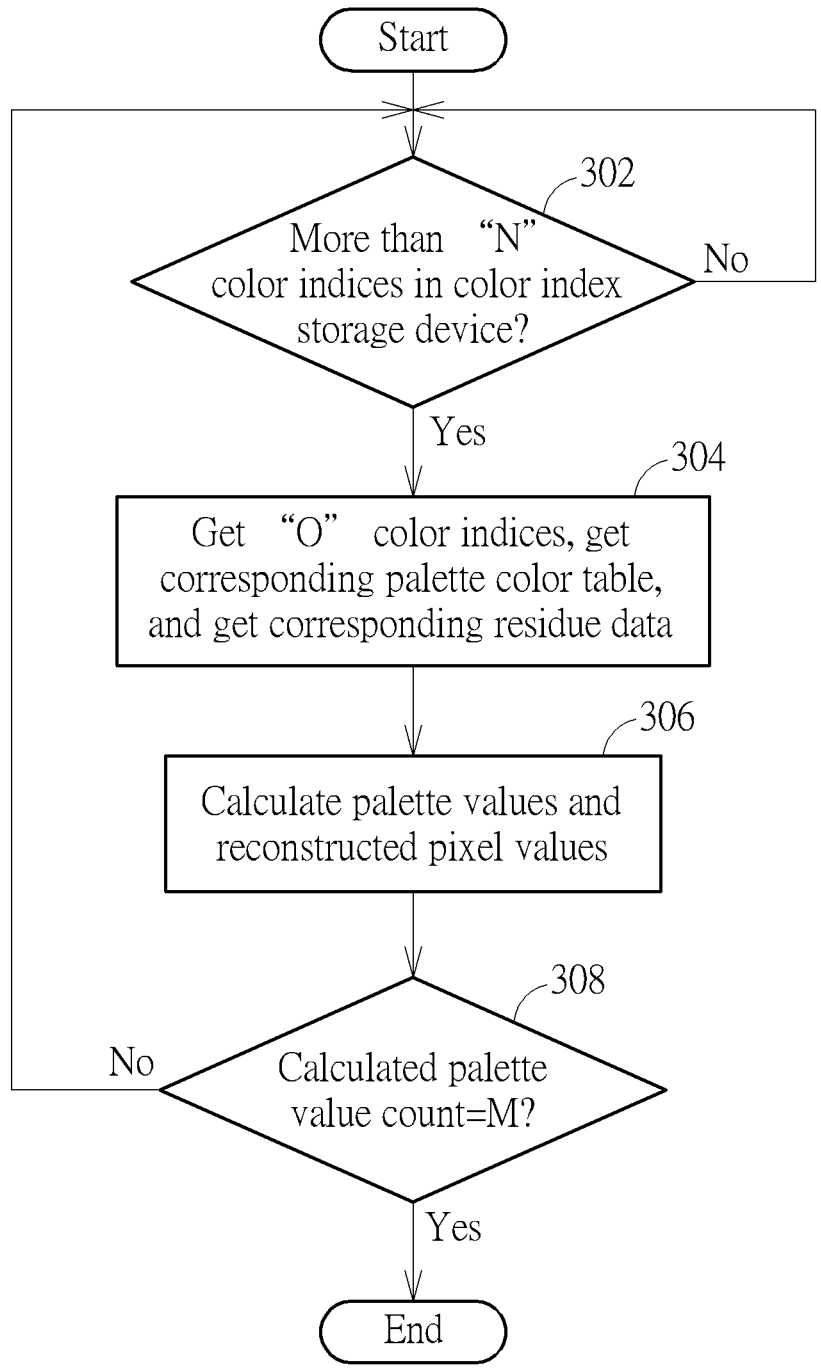
FIG. 3 is a flowchart illustrating a TU-based palette value calculation process involved in a palette decoding process according to an embodiment of the present invention.

As mentioned above, the palette decoding apparatus 100 is designed to perform palette decoding in a small-sized coding unit based manner for achieving high performance and low cost palette decoding. For example, the palette value processing circuit 102 performs step 212 to calculate palette values of pixels in a TU-based manner. FIG. 3 is a flowchart illustrating a TU-based palette value calculation process involved in a palette decoding process according to an embodiment of the present invention. Provided that the result is substantially the same, the steps are not required to be executed in the exact order shown in FIG. 3. At step 302, the palette value processing circuit 102 checks if there are more than "N" color indices in the color index storage device 104, where N is an integer, M is the number of all palette values to be calculated in the current TU, and 1≤N≤M. The flow does not proceed with step 304 until the condition checked at step 302 is met. At step 304, the palette value processing circuit 102 gets "O" color indices from the color index storage device 104, and gets corresponding palette colors from the palette color storage device 106, where O is an integer and 1≤O≤N. In addition, the reconstruction circuit 200 gets the corresponding residue data. At step 306, the palette value processing circuit 102 calculates "O" palette values according to the "O" color indices and the corresponding palette colors. In addition, the reconstruction circuit 200 calculates the reconstructed result according to the palette values determined by the palette value processing circuit 102. At step 308, the palette value processing circuit 102 checks if the calculated palette value count reaches M. When the calculated palette value count reaches M, it means all palette values associated with the current TU have been determined by the palette value processing circuit 102. Hence, the palette value calculation process for the current TU is finished. When the calculated palette value count does not reach M yet, the flow proceeds with step 302. Further details of the proposed coding unit based palette decoding scheme (e.g., TU-based palette decoding scheme) are described as below.

Figure 4:
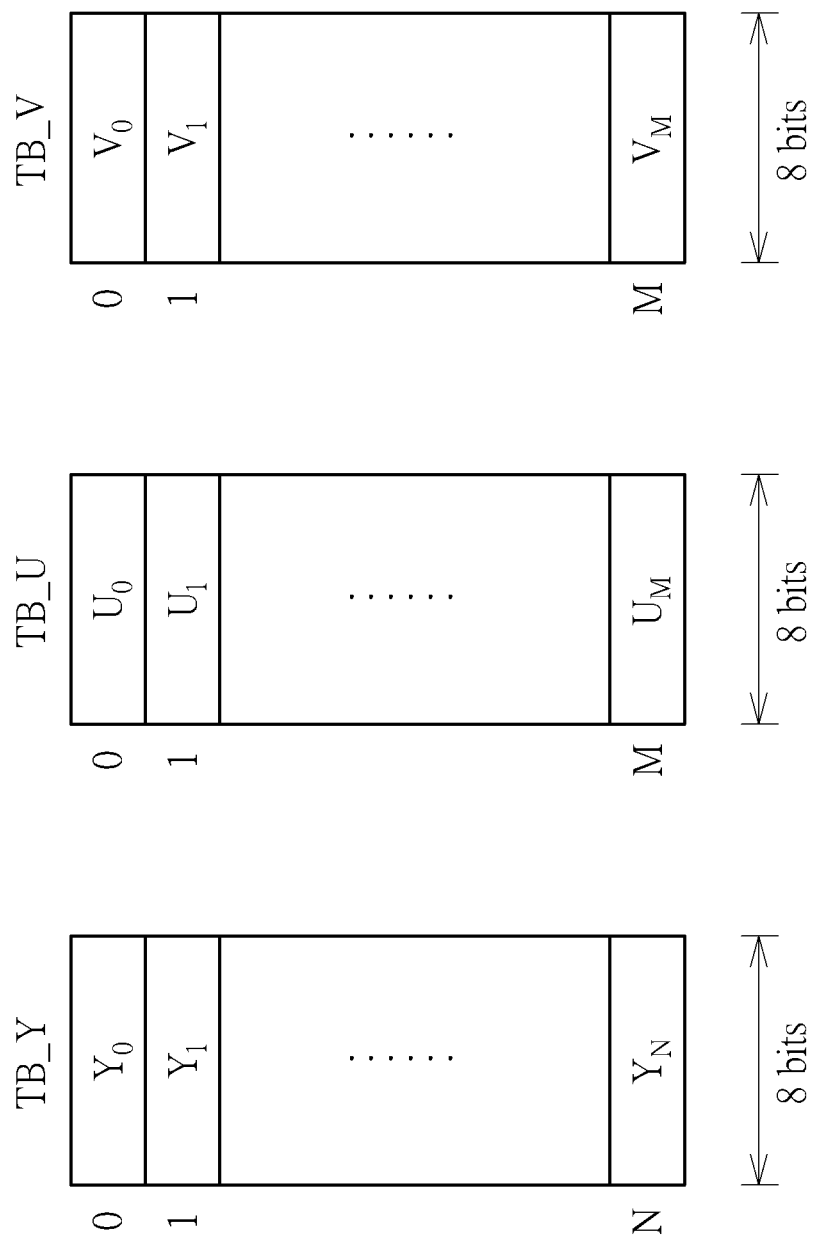
FIG. 4 is a diagram illustrating a plurality of palette color tables stored in the palette color storage device shown in FIG. 1 according to an embodiment of the present invention.

As mentioned above, the palette color storage device 106 is arranged to store palette colors decoded from the bitstream BS. In this embodiment, the palette value processing circuit 102 calculates palette values of pixels in a TU-based manner. When a palette mode is used by one MI unit, palette decoding of each TU included in the MI unit shares the same palette colors (i.e., base colors) that are used for palette encoding the MI unit. FIG. 4 is a diagram illustrating a plurality of palette color tables stored in the palette color storage device 106 according to an embodiment of the present invention. Palette encoding of one MI unit may establish a luma palette color table TB_Y of a Y plane, a chroma palette color table TB_U of a U plane, and a chroma palette color table TB_V of a V plane. The luma palette color table TB_Y with a palette size N+1 has 8-bit palette colors $Y_0$-$Y_N$ indexed by color indices (palette indices) 0-N, respectively, where 2≤N+1≤8. In this example, the chroma palette color tables TB_U and TB_V may have the same palette size M+1 but different palette colors, where 2≤M+1≤8. The chroma palette color table TB_U with the palette size M has 8-bit palette colors $U_0$-$U_M$ indexed by color indices (palette indices) 0-M, respectively. The chroma palette color table TB_V with the palette size M has 8-bit palette colors $V_0$-$V_M$ indexed by color indices (palette indices) 0-M, respectively. The palette colors $Y_0$-$Y_N$, $U_0$-$U_M$, $V_0$-$V_M$ and palette sizes N+1 and M+1 for one MI unit are encoded and signaled via the bitstream BS. Hence, after the palette colors $Y_0$-$Y_N$, $U_0$-$U_M$, $V_0$-$V_M$ and palette sizes N+1 and M+1 for one MI unit are decoded from the bitstream BS, the same luma palette color table TB_Y, chroma palette color table TB_U, and chroma palette color table TB_V used by palette encoding at the video encoder are obtained and stored in the palette color storage device 106 at the video decoder.

As mentioned above, the color index storage device 104 is arranged to store color indices decoded from the bitstream BS. Regarding palette encoding at the video encoder, a Y-channel value of a pixel is palette encoded by using one of the color indices (palette indices) 0-N that is representative of one of the palette colors $Y_0$-$Y_N$, a U-channel value of the pixel is palette encoded by using one of the color indices (palette indices) 0-M that is representative of one of the palette colors $U_0$-$U_M$, and a V-channel value of the pixel is palette encoded by using one of the color indices (palette indices) 0-M that is representative of one of the palette colors $V_0$-$V_M$. For each pixel included in one TU encoded under the palette mode, YUV color indices of the pixel are encoded and signaled via the bitstream BS. Hence, after the YUV color indices of the pixel are decoded from the bitstream BS, the YUV color indices of the pixel are obtained and stored into the color index storage device 104 at the video decoder.

Figure 5:
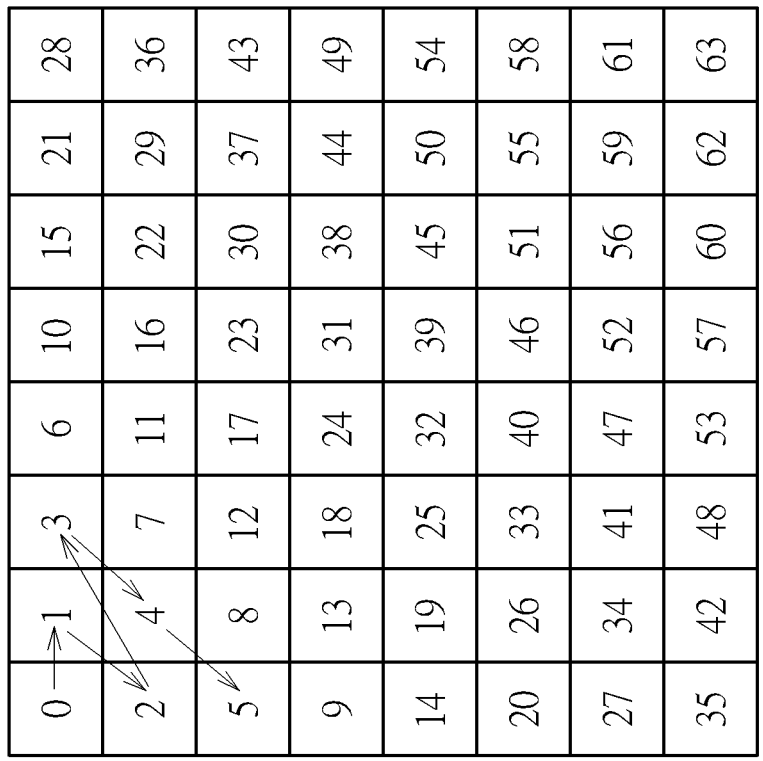
FIG. 5 is a diagram illustrating an operation of writing color indices of pixels into a color index storage device shown in FIG. 1 to create a color index map for one TU according to an embodiment of the present invention.
Figure 5:
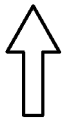

In accordance with the palette mode, pixels in one TU can be predicted at the video encoder in a wavefront order to allow parallel computation. Hence, Y color indices of pixels in the same TU can be encoded and transmitted in a wavefront order, U color indices of pixels in the same TU can be encoded and transmitted in a wavefront order, and V color indices of pixels in the same TU can be encoded and transmitted in a wavefront order. In this embodiment, the entropy decoder 10 can decode and output Y color indices of pixels in the same TU in a wavefront order, can decode and output U color indices of pixels in the same TU in a wavefront order, and can decode and output V color indices of pixels in the same TU in a wavefront order. FIG. 5 is a diagram illustrating an operation of writing color indices of pixels into the color index storage device 104 to create a color index map for one TU according to an embodiment of the present invention. Suppose that a size of a current TU to be palette decoded is 8×8. A luma color index map M_CB_Y of the Y plane of the TU is created in the color index storage device 104 by sequentially writing Y color indices of pixels in the TU in a write buffer order that is the same as a decode order. As shown in FIG. 5, the write buffer order is a wavefront order as indicated by the reference numerals.

Figure 6:
FIG. 6 is a diagram illustrating an operation of reading color indices of a color index map from the color index storage device shown in FIG. 1 according to an embodiment of the present invention.

The Y color index of one pixel is used to indicate a palette color in the luma palette color table TB_Y. Hence, Y color indices in the luma color index map M_CB_Y are read from the color index storage device 104 for calculating palette values used to reconstruct Y-channel values of pixels in the TU. FIG. 6 is a diagram illustrating an operation of reading color indices of a color index map from the color index storage device 104 according to an embodiment of the present invention. Since Y color indices in the luma color index map M_CB_Y are used for calculating palette values used to reconstruct Y-channel values of pixels in the TU, Y color indices arranged in the luma color index map M_CB_Y are read from the color index storage device 104 in a read buffer order that is the same as a residue data output order. As shown in FIG. 6, the read buffer order is a column-by-column order indicated by the reference numerals.

Similarly, a chroma color index map M_CB_U of the U plane of the TU is created in the color index storage device 104 by sequentially writing U color indices of pixels in the TU in a write buffer order that is the same as a decode order, and U color indices arranged in the chroma color index map M_CB_U are read from the color index storage device 104 in a read buffer order that is the same as a residue data output order. Furthermore, a chroma color index map M_CB_V of the V plane of the TU is created in the color index storage device 104 by sequentially writing V color indices of pixels in the TU in a write buffer order that is the same as a decode order, and V color indices arranged in the luma color index map M_CB_V are read from the color index storage device 104 in a read buffer order that is the same as a residue data output order. Since a person skilled in the art can readily understand details of the write buffer order and the read buffer order of the chroma color index maps M_CB_U and M_CB_V after reading above paragraphs directed to the luma color index map M_CB_Y, further description is omitted here for brevity.

When the luma palette color table TB_Y and chroma palette color tables TB_U and TB_V are available in the palette color storage device 106 and the luma color index map M_CB_Y and chroma color index maps M_CB_U and M_CB_V are available in the color index storage device 104, the palette value processing circuit 102 calculates palette values of pixels in one TU according to color indices read from the color index storage device 104 and palette colors stored in the palette color storage device 106.

Figure 7:
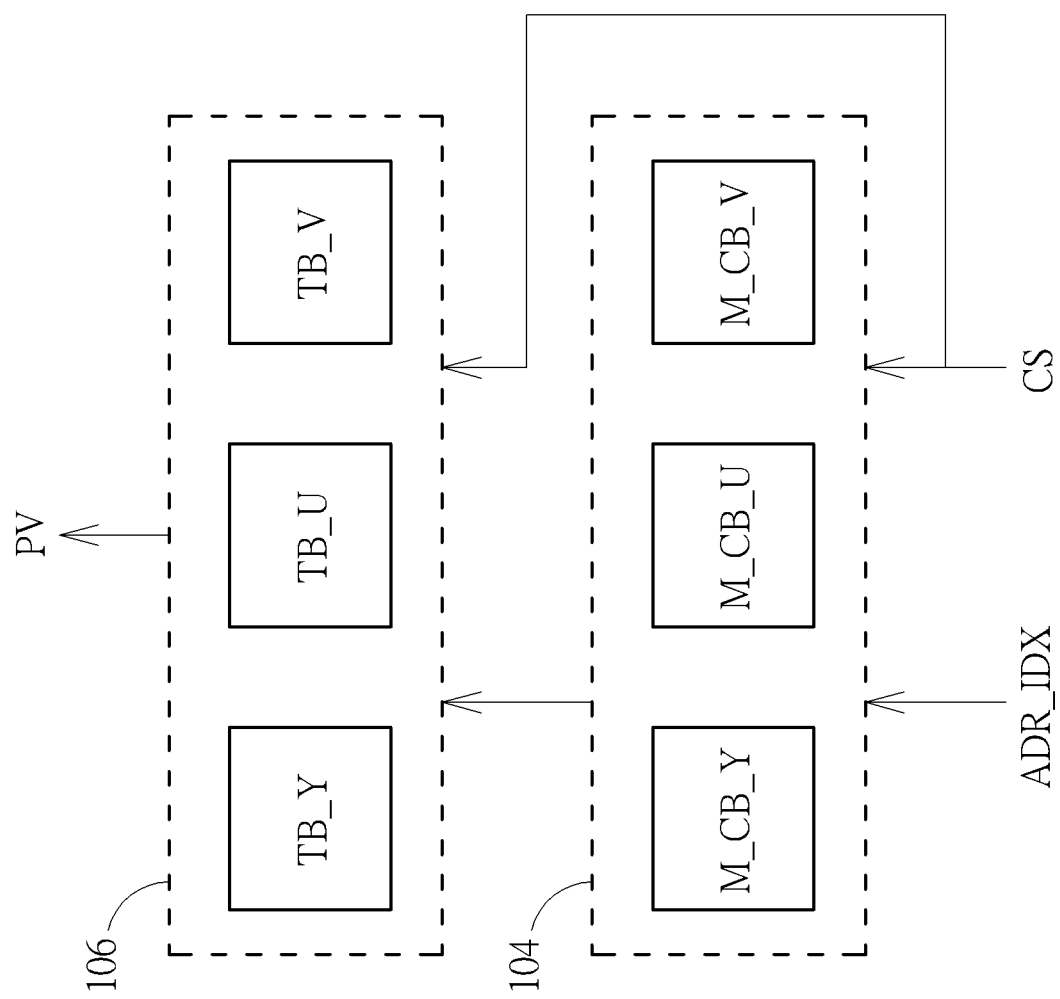
FIG. 7 is a diagram illustrating a palette value generation process performed by a palette value processing circuit shown in FIG. 1 according to an embodiment of the present invention.

FIG. 7 is a diagram illustrating a palette value generation process performed by the palette value processing circuit 102 according to an embodiment of the present invention. The palette value processing circuit 102 outputs a control signal CS to the palette color storage device 106 for selecting one of the luma palette color table TB_Y and chroma palette color tables TB_U and TB_V, and further outputs the control signal CS to the color index storage device 104 for selecting one of the luma color index map M_CB_Y and chroma color index maps M_CB_U and M_CB_V, where the control signal CS acts as a plane selection signal. The palette value processing circuit 102 outputs an index address ADR_IDX to the color index storage device 104 for selecting a color index of a pixel from a selected color index map (i.e., a color index map selected by the control signal CS), searches a selected palette color table (i.e., a palette color table selected by the control signal CS) for a palette color indexed by the selected color index that is stored at the index address ADR_IDX, and sets the palette value PV of the pixel by the palette color found in the selected palette color table.

For example, when a Y-channel value of a pixel is needed to be reconstructed at this moment, the palette value processing circuit 102 updates the control signal CS to select the luma palette color table TB_Y and the luma color index map M_CB_Y, and updates the index address ADR_IDX to select a Y color index of the pixel that is stored in the luma color index map M_CB_Y. Hence, the palette value PV associated with reconstruction of the Y-channel value of the pixel is determined and output by the palette value processing circuit 102.

For another example, when a U-channel value of a pixel is needed to be reconstructed at this moment, the palette value processing circuit 102 updates the control signal CS to select the chroma palette color table TB_U and the chroma color index map M_CB_U, and updates the index address ADR_IDX to select a U color index of the pixel that is stored in the chroma color index map M_CB_U. Hence, the palette value PV associated with reconstruction of the U-channel value of the pixel is determined and output by the palette value processing circuit 102.

For yet another example, when a V-channel value of a pixel is needed to be reconstructed at this moment, the palette value processing circuit 102 updates the control signal CS to select the chroma palette color table TB_V and the chroma color index map M_CB_V, and updates the index address ADR_IDX to select a V color index of the pixel that is stored in the chroma color index map M_CB_V. Hence, the palette value PV associated with reconstruction of the V-channel value of the pixel is determined and output by the palette value processing circuit 102.

In this embodiment, the palette value processing circuit 102 is arranged to perform a TU-based palette value calculation process. Hence, the color index storage device 104 can be implemented by a small-sized buffer with a storage capacity sufficient for buffering color indices needed by the TU-based palette value calculation process, and/or the palette color storage device 106 can be implemented by a small-sized buffer with a storage capacity sufficient for buffering palette colors needed by the TU-based palette value calculation process.

As shown in FIG. 7, the palette color storage device 106 stores luma palette color table TB_Y and chroma palette color tables TB_U, TB_V for a single MI unit, where palette decoding of each TU in the same MI unit shares the same luma palette color table TB_Y and chroma palette color tables TB_U, TB_V. In one exemplary design, the palette color storage device 106 stores palette colors needed by palette decoding of each TU in a first MI unit of a frame (e.g., luma palette color table TB_Y and chroma palette color tables TB_U, TB_V used by palette mode of the first MI unit), and then stores palette colors needed by palette decoding of each TU in a second MI unit of the frame (e.g., luma palette color table TB_Y and chroma palette color tables TB_U, TB_V used by palette mode of the second MI unit) by overwriting at least a portion (i.e., part or all) of the palette colors needed by palette decoding of each TU in the first MI unit. Since the storage capacity of the palette color storage device 106 is equal to a maximum size of palette colors needed by palette decoding of one MI unit, the limited storage capacity of the palette color storage device 106 is used for buffering palette color tables used by palette mode of one MI unit, and is reused for buffering palette color tables used by palette mode of another MI unit.

As shown in FIG. 7, the color index storage device 104 stores luma color index map M_CB_Y and chroma color index maps M_CB_U, M_CB_V for a single TU, where Y color indices of all pixels in the same TU are arranged in the luma color index map M_CB_Y, U color indices of all pixels in the same TU are arranged in the chroma color index map M_CB_U, and V color indices of all pixels in the same TU are arranged in the chroma color index map M_CB_V. In one exemplary design, the color index storage device 104 stores color indices of pixels included in a first TU (e.g., luma color index map M_CB_Y and chroma color index maps M_CB_U, M_CB_V of the first TU), and then stores color indices of pixels included in a second TU (e.g., luma color index map M_CB_Y and chroma color index maps M_CB_U, M_CB_V of the second TU) by overwriting at least a portion (i.e., part or all) of the color indices of pixels included in the first TU. Since the storage capacity of the color index storage device 104 is equal to a maximum size of color indices of all pixels in one TU, the limited storage capacity of the color index storage device 104 is used for buffering color indices of pixels in one TU, and is reused for buffering color indices of pixels in another TU. To put it simply, the palette value processing circuit 102 calculates palette values of pixels in a TU-based manner, and thus the storage capacity of the color index storage device 104 is allowed to be smaller than a size of color indices of all pixels in one frame.

Regarding a low cost palette decoding design in a video decoder, the maximum storage capacity of the palette color storage device 106 may be capable of buffering palette colors used by palette mode of only a single MI unit, and the maximum storage capacity of the color index storage device 104 may be capable of buffering color indices of pixels included in only a single TU. However, this is for illustrative purposes only, and is not meant to be a limitation of the present invention. There is tradeoff between cost and performance. In one alternative design, the maximum storage capacity of the palette color storage device 106 may be capable of buffering palette colors used by palette mode of K MI units (K≥2) included in a frame to be decoded, and/or the maximum storage capacity of the color index storage device 104 may be capable of buffering color indices of pixels included in L TUs (L≥2) of an MI unit to be decoded, where the frame to be decoded may be divided into K' MI units (K'>K), and the MI unit to be decoded may be divided into L' TUs (L'>L). For example, the palette color storage device 106 may be implemented by a ping-pong buffer, and/or the color index storage device of 104 may be implemented by a ping-pong buffer.

Figure 8:
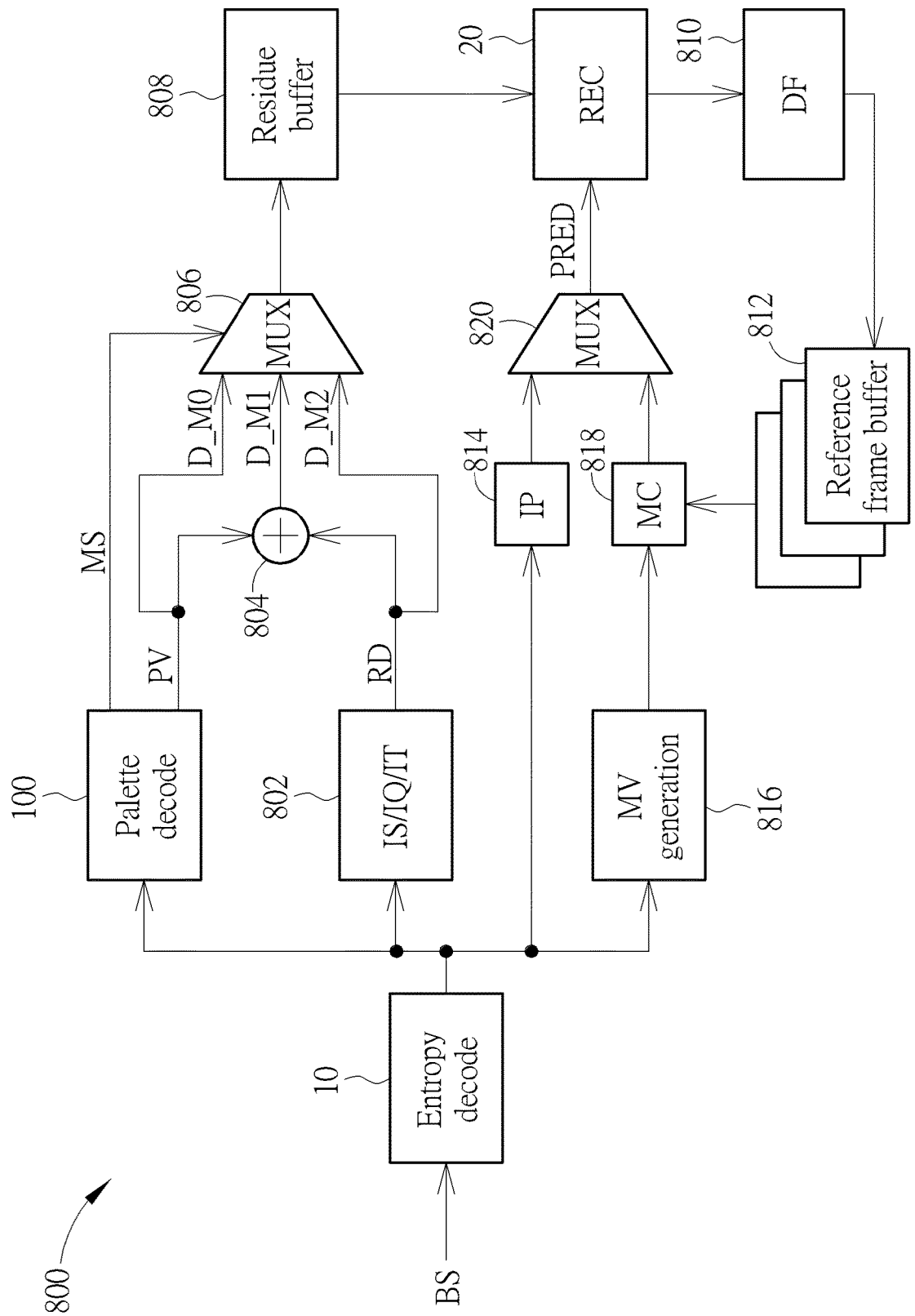
FIG. 8 is a diagram illustrating a first video decoder according to an embodiment of the present invention.

The palette value output D_OUT of the palette decoding apparatus 100 includes palette values for reconstruction of pixels. Reconstruction of a pixel in a TU may require a palette value of the pixel, or a residue data of the pixel, or both of the palette value and the residue data of the pixel, depending upon a coding mode of the TU. FIG. 8 is a diagram illustrating a first video decoder according to an embodiment of the present invention. For example, the video decoder 800 may be an AV1 decoder. As shown in FIG. 8, the video decoder 800 includes the aforementioned entropy decoder (denoted by "Entropy decode") 10, palette decoding apparatus (denoted by "Palette decode") 100, and reconstruction circuit (denoted by "REC") 20, and further includes a residue decoding circuit (denoted by "IS/IQ/IT") 802, an adder circuit 804, a plurality of multiplexer circuits (denoted by "MUX") 806 and 820, a residue buffer 808, a deblocking filter (denoted by "DF") 810, at least one reference frame buffer 812, an intra prediction circuit (denoted by "IP") 814, a motion vector generation circuit (denoted by "MV generation") 816, and a motion compensation circuit (denoted by "MC") 818.

The palette decoding apparatus 100 is capable of generating a palette value PV of each pixel included in one TU to be reconstructed. The residue decoding circuit 802 is capable of generating a residue data RD for each pixel included in one TU to be reconstructed. For example, the residue decoding circuit 802 may apply inverse scan (IS), inverse quantization (IQ), and inverse transform (IT) to an entropy decoding result of the bitstream BS for obtaining the residue data RD. The adder circuit 840 is arranged to add a palette value PV to a residue data RD to generate an adjusted residue data. The multiplexer circuit 806 includes a first input port, a second input port, a third input port, and an output port, where the first input port is arranged to receive an output of the palette decoding apparatus 100 as Mode 0 data D_M0 (e.g., D_M0=PV), the second input port is arranged to receive an output of the adder circuit 804 as Mode 1 data D_M1 (e.g; D_M1=PV+RD), the third input port is arranged to receive an output of the residue decoding circuit 816 as Mode 2 data D_M2 (e.g., D_M2=RD), and the output port is arranged to output one of Mode 0 data D_M0, Mode 1 data D_M1, and Mode 2 data D_M1 to the residue buffer 808.

The multiplexer circuit 806 is controlled by a mode selection signal MS generated from control logic of the palette decoding apparatus 100. In other words, the mode selection signal MS decides which one of an output of the palette decoding apparatus 100, an output of the adder circuit 804, and an output of the residue decoding circuit 816 is stored into the residue buffer 808. The reconstruction 20 reads stored data from the residue buffer 808 for reconstruction of pixels in one TU. When reconstruction of a TU does not require residue data, the mode selection signal MS is set by Mode 0 (which is a "palette value only" mode), such that the multiplexer 806 passes palette values PV of pixels in the TU to the residue buffer 808 for use in reconstruction. When reconstruction of a TU requires palette values as well as residue data, the mode selection signal MS is set by Mode 1 (which is a "palette value plus residue data" mode), such that the multiplexer 806 passes a result of combining the palette value PV and the residue data RD to the residue buffer 808 for use in reconstruction. When reconstruction of a TU does not require palette values, the mode selection signal MS is set by Mode 2 (which is a "residue data only" mode), such that the multiplexer 806 passes the residue data RD to the residue buffer 808 for use in reconstruction.

Figure 9:
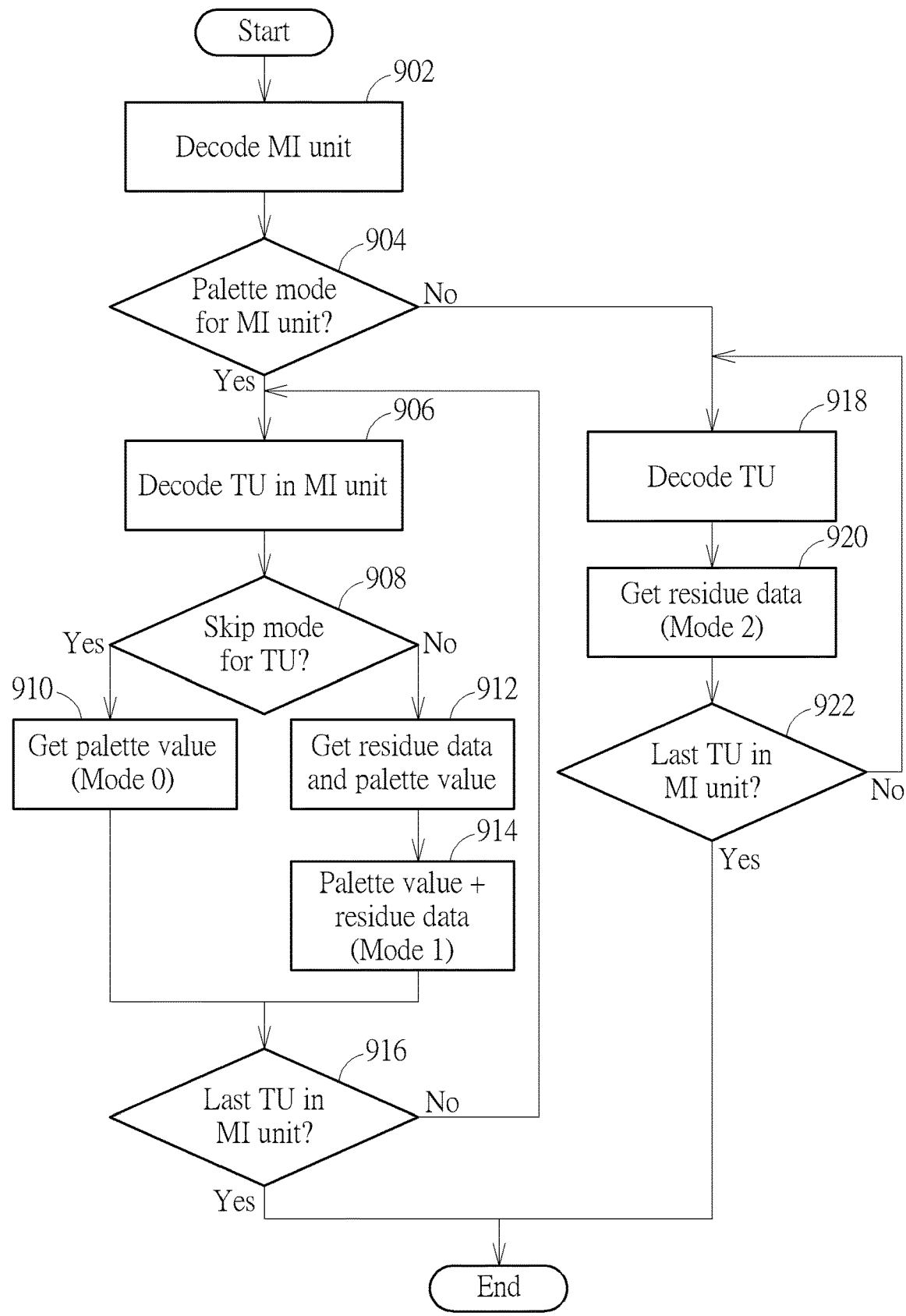
FIG. 9 is a flowchart illustrating a control flow involved in decoding TUs in an MI unit of a frame according to an embodiment of the present invention.

FIG. 9 is a flowchart illustrating a control flow involved in decoding TUs in an MI unit of a frame according to an embodiment of the present invention. Provided that the result is substantially the same, the steps are not required to be executed in the exact order shown in FIG. 9. At step 902, decoding of an MI unit is started. At step 904, it is checked to see if a palette mode is used by the MI unit. If the palette mode is not used by the MI unit, there is no need to perform the proposed TU-based palette decoding process, and the flow proceeds with step 918. At step 918, decoding of a current TU in the MI unit is started. At step 920, the multiplexer 806 gets the residue data RD from the residue decoding circuit 802, and stores the residue data RD into the residue buffer 808 for use in reconstruction. At step 922, it is checked to see if the current TU is the last TU in the MI unit. When the current TU is the last TU in the MI unit, decoding of the MI unit is finished. When the current TU is not the last TU in the MI unit, the flow proceeds with step 918 to process a next TU in the MI unit.

When step 904 indicates that the palette mode is used by the MI unit, the flow proceeds with step 906. At step 906, decoding of a current TU in the MI unit is started. At step 908, it is checked to see if a skip mode is used by the current TU. When the skip mode is used by the current TU, there is no information sent from the video encoder to the video decoder. For example, the bitstream BS has no coded transform coefficients, no header, and no intra/inter prediction information for a skip mode TU. Hence, no residue data RD is generated from the residue decoding circuit 802 for the current TU being a skip mode TU. At step 910, the multiplexer 806 gets the palette values PV from the palette decoding apparatus 100, and stores the palette values PV into the residue buffer 808 for use in reconstruction. It should be noted that, under a condition that the current TU is a skip mode TU, no residue data of the current TU is decoded from the bitstream BS, and the residue buffer 808 is used as a palette buffer for buffering palette values of the current TU. At step 916, it is checked to see if the current TU is the last TU in the MI unit. When the current TU is the last TU in the MI unit, decoding of the MI unit is finished. When the current TU is not the last TU in the MI unit, the flow proceeds with step 906 to process a next TU in the MI unit.

When step 908 indicates that the skip mode is not used by the current TU, residue data RD is generated from the residue decoding circuit 802 for the current TU being a non-skip mode TU. At step 912, the adder circuit 804 gets the palette values PV from the palette decoding apparatus 100 and the residue data RD from the residue decoding circuit 802. By way of example, but not limitation, the residue decoding circuit 802 asserts a residue data ready signal at the time all residue data RD of the current TU are ready, and the palette decoding apparatus 100 does not perform a palette value calculation process for generating palette values PV of the current TU until the residue data ready signal is asserted by the residue decoding circuit 802. At step 914, the multiplexer 806 receives adjusted residue data from the adder circuit 804, and stores the adjusted residue data into the residue buffer 808 for use in reconstruction. At step 916, it is checked to see if the current TU is the last TU in the MI unit. When the current TU is the last TU in the MI unit, decoding of the MI unit is finished. When the current TU is not the last TU in the MI unit, the flow proceeds with step 906 to process a next TU in the MI unit.

The reconstruction circuit 20 reads stored data in the residue buffer 808 for use in reconstruction. In addition, when a TU is encoded using an intra mode or an inter mode, a predictor PRED is further used by the reconstruction circuit 20, where the predictor PRED may be an intra-mode predictor determined by the intra-prediction circuit 814 or an inter-mode predictor determined by the motion vector generation circuit 816 and the motion compensation circuit 818. Specifically, when the current TU is encoded using the intra mode, the multiplexer 820 outputs the intra-mode predictor to the reconstruction circuit 20; and when the current TU is encoded using the inter mode, the multiplexer 820 outputs the inter-mode predictor to the reconstruction circuit 20. The deblocking filter 810 is used to perform de-blocking processing after reconstruction. Hence, a reconstructed frame generated from the reconstruction circuit 20 is stored into the reference frame buffer 814 through the deblocking filter 810.

The architecture shown in FIG. 8 uses the same residue buffer 808 to store Mode 0 data D_M0 used by reconstruction of a skip mode TU in a palette mode MI unit, Mode 1 data D_M1 used by reconstruction of a non-skip mode TU in a palette mode MI unit, and Mode 2 data D_M2 used by reconstruction of a TU in a non-palette mode MI unit at different timings. In this way, the buffer requirement of the video decoder can be relaxed. However, this is for illustrative purposes only, and is not meant to be a limitation of the present invention. In practice, any video decoder using the proposed high performance and low cost palette decoding apparatus 100 falls within the scope of the present invention. In an alternative design, one palette buffer and one residue buffer may be both implemented in a video decoder that uses the proposed high performance and low cost palette decoding apparatus 100.

Figure 10:
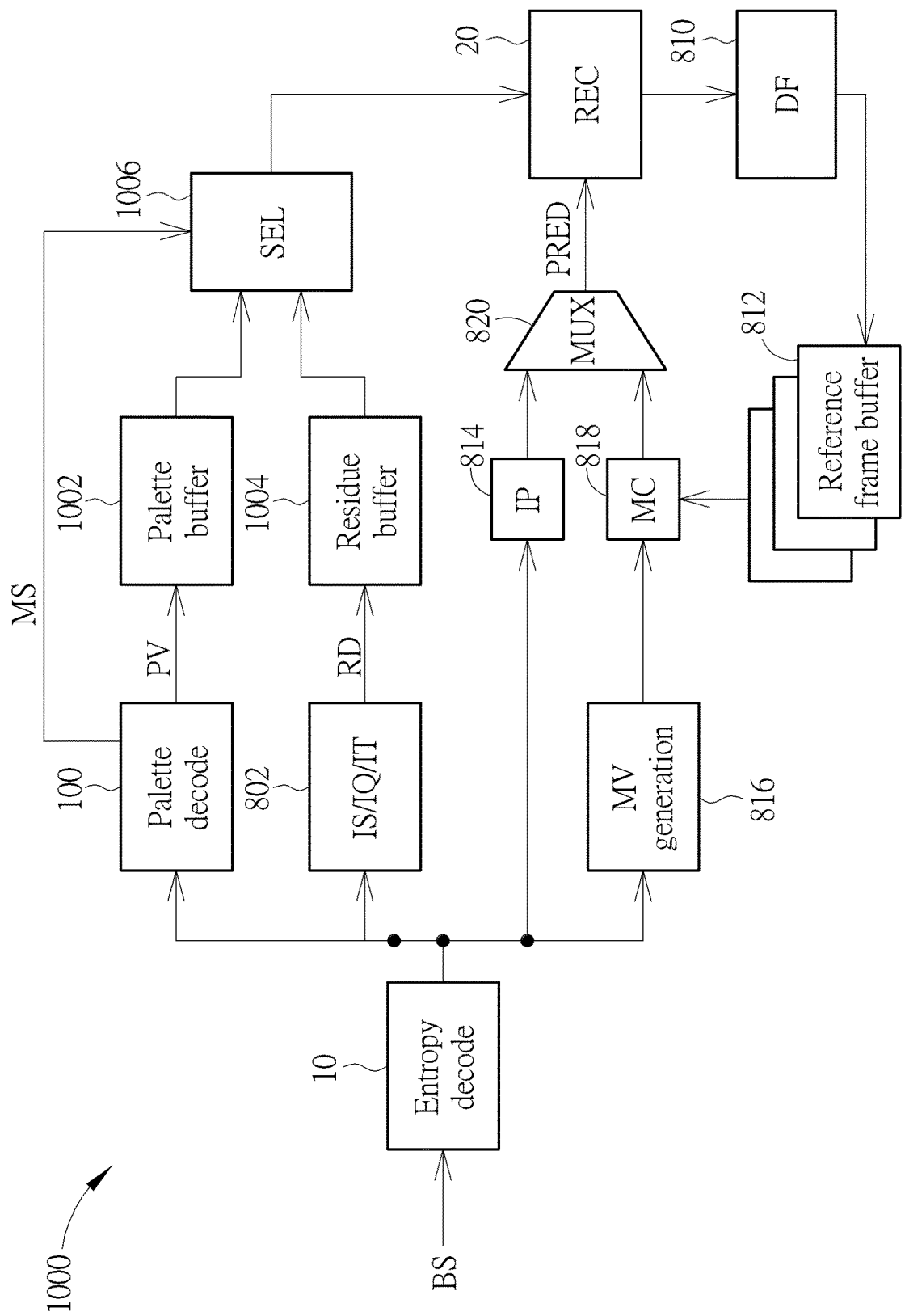
FIG. 10 is a diagram illustrating a second video decoder according to an embodiment of the present invention.

FIG. 10 is a diagram illustrating a second video decoder according to an embodiment of the present invention. For example, the video decoder 1000 may be an AV1 decoder. As shown in FIG. 10, the video decoder 800 includes the aforementioned entropy decoder 10, palette decoding apparatus 100, reconstruction circuit 20, residue decoding circuit 802, deblocking filter 810, reference frame buffer 812, intra prediction circuit 814, motion vector generation circuit 816, motion compensation circuit 818, and multiplexer circuit 820, and further includes a palette buffer 1002, a residue buffer 1004, and a selection circuit (denoted by "SEL") 1006. The palette buffer 1002 is arranged to store palette values PV of pixels that are generated from the palette decoding apparatus 100. The residue buffer 1004 is arranged to store residue data RD of pixels that are generated from the residue decoding circuit 802. The selector circuit 1006 is controlled by the mode selection signal MS generated from control logic of the palette decoding apparatus 100, and has a first input port, a second input port, and an output port, where the first input port is arranged to receive palette values PV read from the palette buffer 1002, the second input port is arranged to receive residue data RD read from the residue buffer 1004, and the output port is arranged to output one or both of a data output of the palette buffer 1002 (i.e., palette values PV read from palette buffer 1002) and a data output of the residue buffer 1004 (i.e., residue data RD read from residue buffer 1004) to the reconstruction circuit 20.

In a first case where a current TU to be decoded is a skip mode TU in a palette mode MI unit, palette values PV of the current TU are generated from the palette decoding apparatus 100 and stored into the palette buffer 1002, while no residue data is generated from the residue decoding circuit 802 for the current TU. Since the mode selection signal MS is set by Mode 0 (which is a "palette value only" mode), the selector circuit 1006 passes the palette values PV read from the palette buffer 1002 to the reconstruction circuit 20 for reconstruction of the current TU.

In a second case where a current TU to be decoded is a non-skip mode TU in a palette mode MI unit, palette values PV of the current TU are generated from the palette decoding apparatus 100 and stored into the palette buffer 1002, and residue data RD of the current TU are generated from the residue decoding circuit 802 and stored into the residue buffer 1004. Since the mode selection signal MS is set by Mode 1 (which is a "palette value plus residue data" mode), the selector circuit 1006 passes the palette values PV read from the palette buffer 1002 and the residue data RD read from the residue buffer 1004 to the reconstruction circuit 20 for reconstruction of the current TU, where summation of a palette value PV and a residue data RD of each pixel is achieved at the reconstruction circuit 20 that is implemented by an adder circuit.

In a third case where a current TU to be decoded is a TU in a non-palette mode MI unit, residue data RD of the current TU are generated from the residue decoding circuit 802 and stored into the residue buffer 1004, while no palette value is generated from the palette decoding apparatus 100 for the current TU. Since the mode selection signal MS is set by Mode 2 (which is a "residue data only" mode), the selector circuit 1006 passes the residue data RD read from the residue buffer 1004 to the reconstruction circuit 20 for reconstruction of the current TU.

Figure 11:
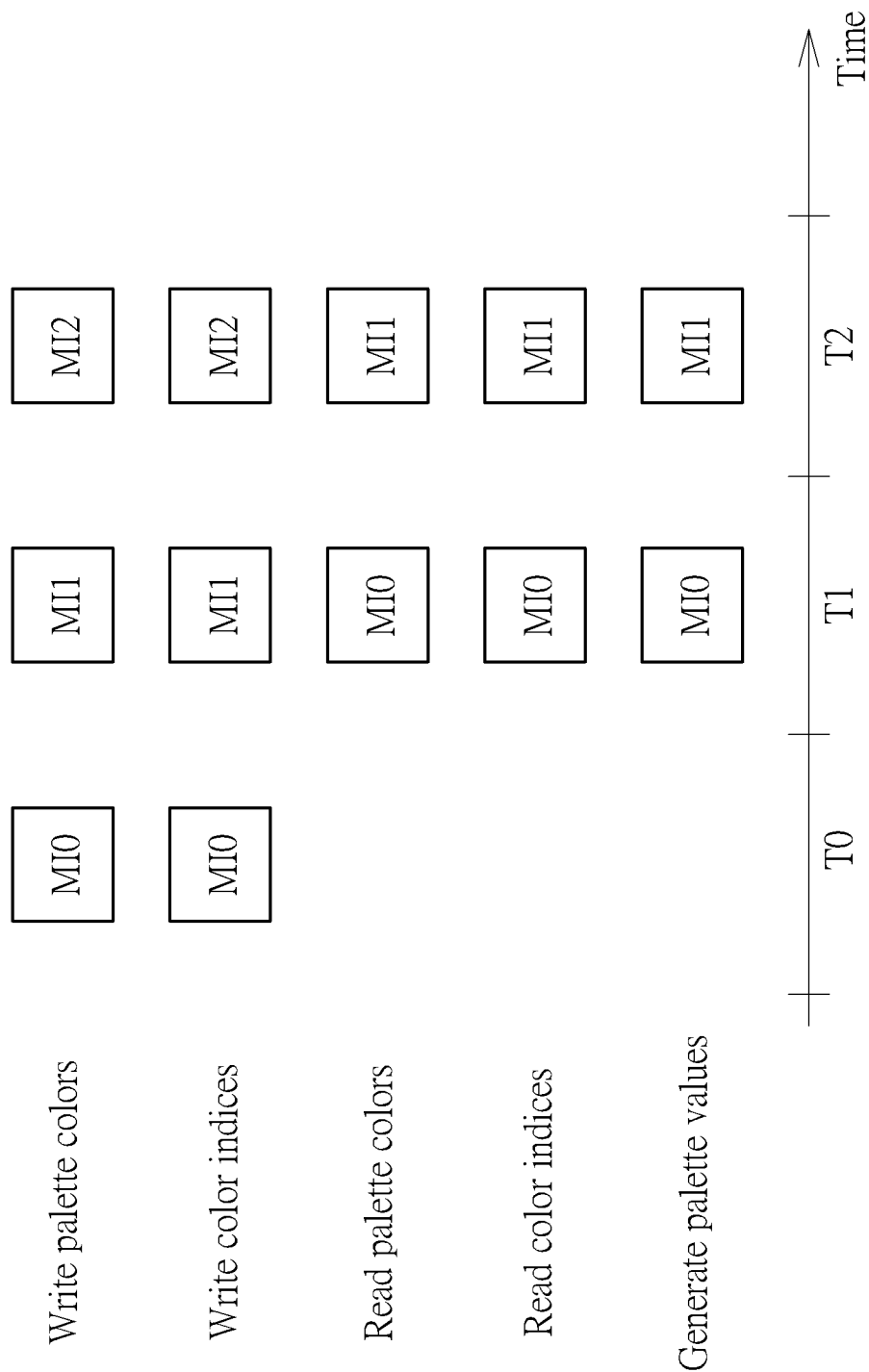
FIG. 11 is a diagram illustrating a pipeline-based palette decoding process according to an embodiment of the present invention.

In above embodiments, the palette decoding apparatus 100 may perform palette decoding in a small-sized coding unit (e.g., TU) based manner rather than a large-sized coding unit (e.g. MI) based manner. Alternatively, the palette decoding apparatus 100 may perform palette decoding in a large-sized coding unit (e.g. MI) based pipeline. Compared to palette decoding performed in a large-sized coding unit (e.g. MI) without pipeline, the palette decoding performed in a large-sized coding unit (e.g. MI) based pipeline can have improved performance. FIG. 11 is a diagram illustrating a pipeline-based palette decoding process according to an embodiment of the present invention. The color index storage device 104 may be configured to have a storage capacity sufficient for buffering color indices of all pixels in one MI group consisting of one or more MI units. In addition, the palette color storage device 106 may be configured to have a storage capacity sufficient for buffering palette colors needed by palette decoding of one MI group consisting of one or more MI unit. Furthermore, the palette value processing circuit 102 does not start generating a palette value of a first pixel in an MI group consisting of one or more MI unit until all palette colors needed by palette decoding of the MI group are stored in the palette color storage device 106 and color indices of all pixels of the MI group are stored in the color index storage device 104.

For clarity and simplicity, it is assumed that each MI group has a single MI unit only. As shown in FIG. 11, palette colors needed by palette decoding of a first MI group (which consists of MI unit MI0) are written into the palette color storage device 106 during a first time period T0, and color indices of all pixels in the first MI group (which consists of MI unit MI0) are written into the color index storage device 104 during the first time period T0. After palette colors needed by palette decoding of the first MI group (which consists of MI unit MI0) are available in the palette color storage device 106 and color indices of all pixels in the first MI group (which consists of MI unit MI0) are available in the color index storage device 104, the palette value processing circuit 102 starts generating palette values of pixels in the first MI group (which consists of MI unit MI0). During a second time period T1, the palette value processing circuit 102 generates palette values of pixels in the first MI group (which consists of MI unit MI0) according to data read from the palette color storage device 106 and color index storage device 104. In addition, palette colors needed by palette decoding of a second MI group (which consists of MI unit MI1) are written into the palette color storage device 106 during the second time period T1, and color indices of all pixels in the second MI group (which consists of MI unit MI1) are written into the color index storage device 104 during the second time period T1. Hence, a processing time of writing palette colors needed by palette decoding of the second MI group (which consists of MI unit MI1) into the palette color storage device 106 and writing color indices of all pixels in the second MI group (which consists of MI unit MI1) into the color index storage device 104 overlaps a processing time of generating palette values of pixels in the first MI group (which consists of MI unit MI0) according to data read from the palette color storage device 106 and the color index storage device 104.

Similarly, after palette colors needed by palette decoding of the second MI group (which consists of MI unit MI1) are available in the palette color storage device 106 and color indices of all pixels in the second MI group (which consists of MI unit MI1) are available in the color index storage device 104, the palette value processing circuit 102 starts generating palette values of pixels in the second MI group (which consists of MI unit MI1). During a third time period T2, the palette value processing circuit 102 generates palette values of pixels in the second MI group (which consists of MI unit MI1) according to data read from the palette color storage device 106 and color index storage device 104. In addition, palette colors needed by palette decoding of a third MI group (which consists of MI unit MI2) are written into the palette color storage device 106 during the third time period T2, and color indices of all pixels in the third MI group (which consists of MI unit MI2) are written into the color index storage device 104 during the third time period T2. Hence, a processing time of writing palette colors needed by palette decoding of the third MI group (which consists of MI unit MI2) into the palette color storage device 106 and writing color indices of all pixels in the third MI group (which consists of MI unit MI2) into the color index storage device 104 overlaps a processing time of generating palette values of pixels in the second MI group (which consists of MI unit MI1) according to data read from the palette color storage device 106 and the color index storage device 104.

It should be noted that the pipeline-based palette decoding process shown in FIG. 11 is for illustrative purposes only, and is not meant to be a limitation of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video decoder comprising:
a palette decoding apparatus, comprising:
a palette color storage device, arranged to store palette colors decoded from a bitstream;
a color index storage device, arranged to store color indices of pixels, wherein the color indices are decoded from the bitstream; and
a palette value processing circuit, arranged to generate a palette value for each pixel of the pixels by:
reading a color index of said each pixel from the color index storage device;
searching for a palette color stored in the palette color storage device that is indexed by the color index of said each pixel; and
setting the palette value of said each pixel by the palette color;
wherein a frame is divided into a plurality of first coding units, each of the first coding units is sub-divided into one or more second coding units, and before a palette value of a last pixel in a first coding unit is generated by the palette value processing circuit, a palette value of a non-last pixel in the first coding unit is generated by the palette value processing circuit and used by a reconstruction circuit of the video decoder;
wherein the palette decoding apparatus generates a palette value for each pixel in one second coding unit, and generates a palette value for each pixel in another second coding unit and the video decoder further comprises:
a residue decoding circuit, arranged to decode an entropy decoding result of the bitstream to generate a residue data for said each pixel in said another second coding unit and generate a residue data for each pixel in yet another second coding unit;
an adder circuit, arranged to add the palette value of said each pixel in said another second coding unit to the residue data of said each pixel in said another second coding unit to generate an adjusted residue data of said each pixel in said another second coding unit;
a storage device; and
a multiplexer circuit, having a first input port, a second input port, a third input port, and an output port, wherein the first input port is arranged to receive an output of the palette decoding apparatus, the second input port is arranged to receive an output of the adder circuit, the third input port is arranged to receive an output of the residue decoding circuit, and the output port is arranged to output the output of the palette decoding apparatus, the output of the adder circuit, and the output of the residue decoding circuit to the same storage device at different timings, respectively;

wherein the reconstruction circuit reads stored data from the storage device for reconstruction.

2. The video decoder of claim 1, wherein the color index storage device stores color indices of pixels included in one of the second coding units, and then stores color indices of pixels included in another of the second coding units by overwriting at least a portion of the color indices of pixels included in said one of the second coding units.

3. The video decoder of claim 2, wherein a storage capacity of the color index storage device is equal to a maximum size of color indices of all pixels in one second coding unit.

4. The video decoder of claim 2, wherein each first coding unit is a mode info (MI) unit, and each second coding unit is a transform unit (TU).

5. The video decoder of claim 1, wherein a storage capacity of the color index storage device is smaller than a size of color indices of all pixels in one first coding unit.

6. The video decoder of claim 1, wherein the palette color storage device stores palette colors needed by palette decoding of each second coding unit in one of the first coding units, and then stores palette colors needed by palette decoding of each second coding unit in another of the first coding units by overwriting at least a portion of the palette colors needed by palette decoding of each second coding unit in said one of the first coding units.

7. The video decoder of claim 6, wherein a storage capacity of the palette color storage device is equal to a maximum size of palette colors needed by palette decoding of one first coding unit.

8. The video decoder of claim 6, wherein each first coding unit is a mode info (MI) unit, and each second coding unit is a transform unit (TU).

9. A video decoder comprising:
a palette decoding apparatus, comprising:
a palette color storage device, arranged to store palette colors decoded from a bitstream;
a color index storage device, arranged to store color indices of pixels, wherein the color indices are decoded from the bitstream; and
a palette value processing circuit, arranged to generate a palette value for each pixel of the pixels by:
reading a color index of said each pixel from the color index storage device;
searching for a palette color stored in the palette color storage device that is indexed by the color index of said each pixel; and
setting the palette value of said each pixel by the palette color;
a first storage device, wherein the palette value processing circuit is further arranged to store a plurality of palette values into the first storage device;
a second storage device;
a residue decoding circuit, arranged to decode an entropy decoding result of the bitstream to generate a plurality of residue data, and store said plurality of residue data into the second storage device; and
a selector circuit, having a first input port, a second input port, and an output port, wherein the first input port is arranged to receive said plurality of palette values read from the first storage device, the second input port is arranged to receive said plurality of residue data read from the second storage device, and the output port is arranged to output one or both of said plurality of palette values and said plurality of residue data to a reconstruction circuit;

wherein a frame is divided into a plurality of first coding units, each of the first coding units is sub-divided into one or more second coding units, and before a palette value of a last pixel in a first coding unit is generated by the palette value processing circuit, a palette value of a non-last pixel in the first coding unit is generated by the palette value processing circuit and used by the reconstruction circuit of the video decoder.

10. A video decoding method comprising:
storing palette colors decoded from a bitstream into a palette color storage device;
storing color indices of pixels into a color index storage device, wherein the color indices are decoded from the bitstream; and
generating a palette value for each pixel of the pixels by:
reading a color index of said each pixel from the color index storage device;
searching for a palette color stored in the palette color storage device that is indexed by the color index of said each pixel; and
setting the palette value of said each pixel by the palette color;
wherein a frame is divided into a plurality of first coding units, each of the first coding units is sub-divided into one or more second coding units, and before a palette value of a last pixel in a first coding unit is generated, a palette value of a non-last pixel in the first coding unit is generated and used by reconstruction of the non-last pixel;
wherein a palette value is generated for each pixel in one second coding unit, and a palette value is generated for each pixel in another second coding unit and the video decoding method further comprises:
decoding an entropy decoding result of the bitstream to generate a residue data for said each pixel in said another second coding unit and generate a residue data for each pixel in yet another second coding unit;
generating an adjusted residue data of said each pixel in said another second coding unit by adding the palette value of said each pixel in said another second coding unit to the residue data of said each pixel in said another second coding unit;
storing a first input comprising palette values generated for said one second coding unit, a second input comprising adjusted residue data generated for said another second coding unit, and a third input comprising residue data generated for said yet another second coding unit into a same storage device at different timings, wherein stored data are read from the storage device for reconstruction of pixels.

11. The video decoding method of claim 10, wherein storing color indices of pixels into the color index storage device comprises:
storing color indices of pixels included in one of the second coding units; and
storing color indices of pixels included in another of the second coding units by overwriting at least a portion of the color indices of pixels included in said one of the second coding units.

12. The video decoding method of claim 11, wherein a storage capacity of the color index storage device is equal to a maximum size of color indices of all pixels in one second coding unit.

13. The video decoding method of claim 11, wherein each first coding unit is a mode info (MI) unit, and each second coding unit is a transform unit (TU).

14. The video decoding method of claim 10, wherein a storage capacity of the color index storage device is smaller than a size of color indices of all pixels in one first coding unit.

15. The video decoding method of claim 10, wherein storing palette colors decoded from the bitstream into the palette color storage device comprises:
   storing palette colors needed by palette decoding of each second coding unit in one of the first coding units; and
   storing palette colors needed by palette decoding of each second coding unit in another of the first coding units by overwriting at least a portion of the palette colors needed by palette decoding of each second coding unit in said one of the first coding units.

16. The video decoding method of claim 15, wherein a storage capacity of the palette color storage device is equal to a maximum size of palette colors needed by palette decoding of one first coding unit.

17. The video decoding method of claim 15, wherein each first coding unit is a mode info (MI) unit, and each second coding unit is a transform unit (TU).

18. A video decoding method comprising:
   storing palette colors decoded from a bitstream into a palette color storage device;
   storing color indices of pixels into a color index storage device, wherein the color indices are decoded from the bitstream; and
   generating a palette value for each pixel of the pixels by:
      reading a color index of said each pixel from the color index storage device;
      searching for a palette color stored in the palette color storage device that is indexed by the color index of said each pixel; and
      setting the palette value of said each pixel by the palette color;
   storing a plurality of palette values into a first storage device;
   decoding an entropy decoding result of the bitstream to generate a plurality of residue data, and store said plurality of residue data into a second storage device; and
   performing reconstruction of pixels by:
      reading said plurality of palette values from the first storage device; or
      reading said plurality of residue data from the second storage device; or
      reading said plurality of palette values from the first storage device, and reading said plurality of residue data from the second storage device;
   wherein a frame is divided into a plurality of first coding units, each of the first coding units is sub-divided into one or more second coding units, and before a palette value of a last pixel in a first coding unit is generated, a palette value of a non-last pixel in the first coding unit is generated and used by reconstruction of the non-last pixel.

19. A video decoder comprising:
   a palette decoding apparatus, comprising:
      a palette color storage device, arranged to store palette colors decoded from a bitstream;
      a color index storage device, arranged to store color indices of pixels, wherein the color indices are decoded from the bitstream; and
      a palette value processing circuit, arranged to generate a palette value for each pixel of the pixels by:
         reading a color index of said each pixel from the color index storage device;
         searching for a palette color stored in the palette color storage device that is indexed by the color index of said each pixel; and
         setting the palette value of said each pixel by the palette color;
   wherein a frame is divided into a plurality of first coding units, and each of the first coding unit is sub-divided into one or more second coding units;
   wherein the palette value processing circuit does not start generating a palette value of a first pixel in a first group of at least one first coding unit until all palette colors needed by palette decoding of the first group are stored in the palette color storage device and color indices of all pixels of the first group are stored in the color index storage device; and
   wherein a processing time of generating palette values of pixels in the first group according to data read from the palette color storage device and the color index storage device overlaps a processing time of writing palette colors needed by palette decoding of a second group of at least one first coding unit into the palette color storage device and writing color indices of pixels of the second group into the color index storage device.

20. The video decoder of claim 19, wherein each first coding unit is a mode info (MI) unit, and each second coding unit is a transform unit (TU).

* * * * *